United States Patent [19]

Sakamoto et al.

[11] Patent Number: 5,534,214
[45] Date of Patent: Jul. 9, 1996

[54] PROCESS FOR COLORING CONCRETE

[75] Inventors: Nobuyuki Sakamoto, Kanagawa-ken; Takehiko Kobayashi; Takashi Horiguchi, both of Tokyo, all of Japan

[73] Assignees: Toyoko Giken Co., Ltd.; Nikko Chemical Institute Inc., both of Kanagawa-ken, Japan

[21] Appl. No.: 350,694

[22] Filed: Dec. 7, 1994

Related U.S. Application Data

[62] Division of Ser. No. 34,358, Mar. 19, 1993, Pat. No. 5,476,722.

[30] Foreign Application Priority Data

Mar. 24, 1992 [JP] Japan ......................... 4-97121
Mar. 1, 1993 [JP] Japan ......................... 5-93517 C

[51] Int. Cl.$^6$ ........................................... B28B 3/00
[52] U.S. Cl. ........................... 264/333; 427/372.2
[58] Field of Search ..................... 427/372.2; 264/333

[56] References Cited

U.S. PATENT DOCUMENTS

| | | | |
|---|---|---|---|
| 3,947,287 | 3/1976 | Belde et al. | 106/413 |
| 5,082,498 | 1/1992 | Kurtz et al. | 106/499 |
| 5,298,335 | 3/1994 | Reed et al. | 428/511 |

*Primary Examiner*—Christopher W. Raimund
*Attorney, Agent, or Firm*—Steinberg, Raskin & Davidson

[57] ABSTRACT

A concrete coloring material and a process for coloring concrete by means of such a concrete coloring material capable of permitting concrete to exhibit natural color or aesthetic properties while preventing concrete from being substantially discolored. Polyethylene oxide is used as a water-soluble adhesive or glue. The oxide is mixed with a composition such as dye, pigment, a mixture thereof or the like, to thereby permit the composition to penetrate into the concrete.

4 Claims, 2 Drawing Sheets

PROCESS FOR COLORING CONCRETE

This is a division, of U.S. patent application Ser. No. 08/034,358, filed Mar. 19, 1993, now U.S. Pat. No. 5,476,722.

BACKGROUND OF THE INVENTION

This invention relates to a concrete coloring material and a process for coloring concrete by means of such concrete coloring material.

Recently, an uneven pattern has frequently been applied to a surface of concrete to improve aesthetic properties of a building and the like. Techniques for such application of the uneven pattern are disclosed in Japanese Patent Application Laid-Open Publication No. 158825/1998, Japanese Patent Application Laid-Open Publication No. 107510/1988 and the like. Unfortunately, the conventional techniques merely forms the uneven pattern on the surface of concrete, but fall to effect coloring of the concrete concurrently with formation of the uneven pattern. When it is desired to color tire surface of the concrete, tire coloring must be carried out by painting after formation of the uneven pattern on the surface.

Also, painting onto the surface of concrete causes tire cost to be extensively increased with an increase in painted area. Further, application of paint to the surface of concrete causes a paint layer formed to unnaturally emit light, to thereby fall to permit tire painted concrete to exhibit natural aesthetic properties.

SUMMARY OF THE INVENTION

The present invention has been made with the view of overcoming the foregoing disadvantage of the prior art.

Accordingly, it is an object of tire present invention to provide a concrete coloring material which is capable of permitting concrete to exhibit natural color and aesthetic properties.

It is another object of the present invention to provide a concrete coloring material which is capable of accomplishing coloring of concrete at a reduced cost and with ease.

It is a further object of the present invention to provide a process for coloring concrete which is capable of accomplishing both formation of an uneven pattern on a surface of concrete and coloring on the uneven pattern of the surface which permits the pattern to exhibit natural aesthetic properties.

It is still another object of the present invention to provide a process for coloring concrete which is capable of permitting concrete to be colored at a reduced cost and with ease.

In accordance with one aspect of the present invention, a concrete coloring material is provided. The concrete coloring material comprises a concrete penetration layer of 30 to 200 µm in thickness formed of polyethylene oxide of a molecular weight as high as about 100,000 to 5,000,000 prepared by ring opening polymerization of ethylene oxide and a composition selected from the group consisting of dye, pigment and a mixture thereof. The concrete coloring material further comprises a substrate on which the concrete penetrating layer is deposited.

In the concrete coloring material thus constructed, when the concrete penetration layer deposited on the substrate is contacted with a surface of concrete prior to drying, the polyethylene oxide of a high molecular weight is dissolved in water contained in the concrete, so that dye or the like contained in the concrete penetration layer penetrates onto the surface of the concrete, resulting in coloring of the concrete.

Also, in accordance with this aspect of the present invention, a concrete coloring material is provided. The concrete coloring material comprises a concrete penetration layer of 30 to 200 µm in thickness formed of polyethylene oxide of a molecular weight as high as about 100,000 to 5,000,000 prepared by ring opening polymerization of ethylene oxide, a composition selected from the group consisting of dye, pigment and a mixture thereof, and a surface-active agent made by fermentation and acting as a dispersant for the composition. The material further comprises a substrate on which the concrete penetrating layer is deposited.

Thus, dye or the like contained in the concrete is extensively dispersed in the surface-active agent acting as dispersant, to thereby promote coloring of the concrete.

In accordance with another aspect of the present invention, a process for coloring concrete is provided. The process comprises the steps of providing a pattern formwork for concrete which is formed on a concrete contact surface thereof to be contacted with concrete with unevenness in contrast with an uneven pattern to be developed on the concrete and applying a concrete penetration layer of 30 to 2000 µm in thickness to the concrete contact surface of the pattern formwork. The concrete penetration layer is formed of polyethylene oxide of a molecular weight as high as about 100,000 to 5,000,000 prepared by ring opening polymerization of ethylene oxide and a composition containing at least one of dye, pigment and a mixture thereof. The process further comprises the steps of locating the pattern formwork in a manner to be opposite to a panel for concrete to define a space therebetween, placing concrete in the space between the pattern formwork and the panel, and releasing the pattern formwork from the concrete after curing of the concrete.

Thus, the surface of concrete is formed thereon with an uneven pattern and concurrently colored with dyes or the like contained in the concrete penetration layer.

Also, in accordance with this aspect of the present invention, a process for coloring concrete is provided. The process comprises the steps of providing a pattern formwork for concrete which is formed on a concrete contact surface thereof to be contacted with concrete with unevenness in contrast with an uneven pattern to be developed on the concrete and applying a concrete penetration layer of 30 to 200 µm in thickness to the concrete contact surface of the pattern formwork. The concrete penetration layer is formed of polyethylene oxide of a molecular weight as high as about 100,000 to 5,000,000 prepared by ring opening polymerization of ethylene oxide, a composition containing at least one of dye, pigment and a mixture thereof, and a surface-active agent prepared by fermentation and serving as a dispersant for the composition. The process further comprises the steps of locating the pattern formwork in a manner to be opposite to a panel for concrete to define a space therebetween, placing concrete in the space between the pattern formwork and the panel, and releasing the pattern formwork from the concrete after curing of the concrete.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE INVENTION

Figure 1:
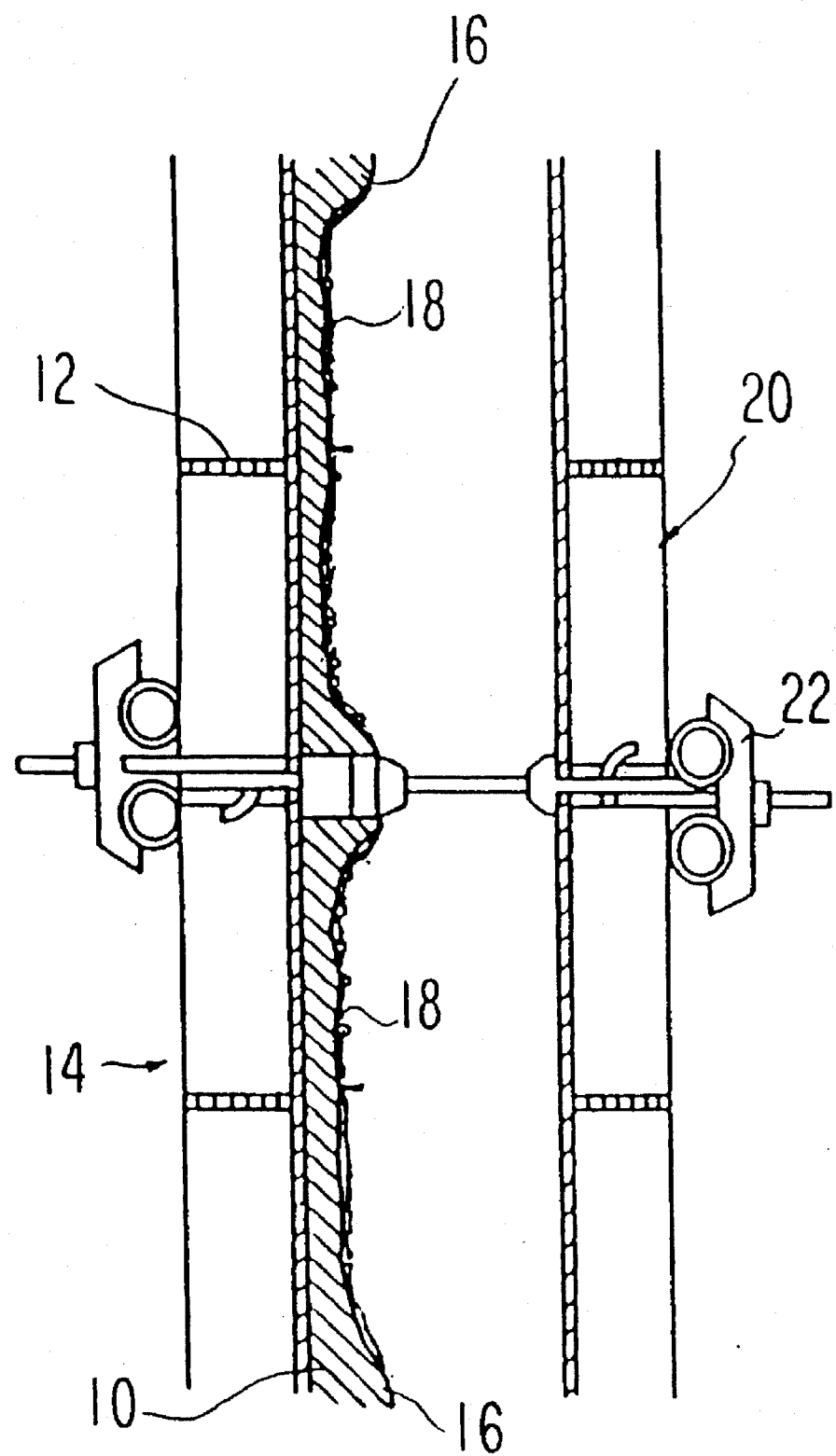
FIG. 1 is a sectional view showing a pattern formwork for concrete and a panel for concrete prior to concrete forming.

A pattern formwork for concrete which is used in the present invention may be made of an expanded polystyrene or urethane resin material, like that disclosed in Japanese Patent Application Laid-Open Publication No. 158825/1984 or Japanese Patent Application Laid-Open Publication No. 107510/1988.

The pattern formwork is applied on a concrete contact surface thereof to be contacted with concrete with a concrete penetration layer of a decreased thickness. When concrete forming is carried out, the concrete penetration layer is dissolved in water contained in concrete to penetrate the concrete, leading to coloring of the concrete. Therefore, in order to apply a composition comprising at least one of dye, pigment, a mixture thereof and the like for coloring of the surface of the pattern framework, it is required to use water-soluble adhesive or glue. In an embodiment of the present invention, polyethylene oxide is used for this purpose.

Also, in the embodiment, a salt of spiculisporic acid is used as dispersant for preventing dye, pigment or the like from coalescing, to thereby effectively promote penetration of dye or pigment into concrete. Spiculisporic acid which is 4,5-dicarboxy- 4-pentadecanolide is expressed by the structural formula:

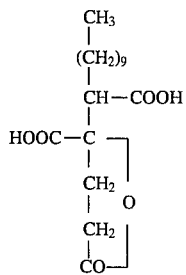

The salt of spiculisporic acid satisfactorily functions as stable dispersant for the dye or pigment in a high pH range without deteriorating surface strength of concrete, like a synthetic surface-active agent. Also, the salt hardly exhibits expandable properties like the surface-active agent, to thereby positively eliminate possible troubles due to expansion during coating or application. The salt of spiculisporic acid may include its monosodium salt, disodium salt and trisodium salt.

Conventionally, materials such as, for example, sodium alginate, carboxymethylcellulose, hydroxyethyl cellulose, polyvinyl alcohol, dextrin, modified starch and the like are generally used as water-soluble adhesive or glue. However, sodium alginate and carboxymethylcellulose are not suitable for use in the present invention, because they react with calcium contained in concrete to form water-insoluble calcium salts. Also, polyvinyl alcohol is likewise unsuitable for use in the present invention, since it is readily gelled by borax contained in concrete. Further, dextrin and modified starch are not preferable in the present invention because they cause fungi to occur therein.

On the contrary, polyethylene oxide, unlike the adhesive or glue described above, exhibits stable viscosity over a wide pH range (pH 4 to 12) and is highly superior in a Toms effect in dilute solution (decrease in flow frictional resistance) to the above-described adhesive or glue. Further, polyethylene oxide functions to coalesce and precipitate suspension of clay, silica or the like and does not lead to deterioration of strength of concrete. Moreover, it exhibits low hygroscopicity. For example, the hygroscopicity is as low as 15% by weight even when a relative humidity is as high as 95%. In addition, it has a property of preventing fungi from occurring therein.

The above-described properties of polyethylene oxide permit dye or the like to penetrate into concrete commonly or widely used for construction by a distance as deep as about 3 to 4 mm without assistance of penetrant such as a synthetic surface-active agent or the like. Nevertheless, when it is desired to further penetrate dye or pigment into concrete by a more increased distance, it is required to prevent coalescence of dye or pigment. Use of the above-described salt of spiculisporic acid permits the penetration to be carried out by a depth of 8 to 10 mm.

A water-soluble composition consisting of polyethylene oxide, the salt of spiculisporic acid, and dye or pigment may be prepared by mixing polyethylene oxide and dye or pigment at a weight ratio of 2:1 to 1:10 and preferably 1:1 to prepare a mixture, adding the salt of spiculisporic acid to the mixture at a weight ratio of 0.2 to 5.0% to the dye or pigment, adding water to the mixture, and then stirring the mixture to prepare a solution of predetermined viscosity. The water-soluble composition thus obtained which functions as the above-described concrete penetration layer is coated at a thickness of about 30 to 200 μm on a surface of the pattern formwork to be contacted with concrete by means of a brush, a spray gun or the like and then dried at a normal temperature or by means of heated air.

The above-described application of the water-soluble composition serving as the concrete penetration layer to tire pattern formwork may be carried out in site by means of a brush, a spray gun or the like, to thereby eliminate a fear that it is exposed to water, rain or the like before it is actually used.

In general, concrete forming causes bleeding, which results in rising or upward movement of water in concrete. Such bleeding transfers dye or the like in concrete while upwardly moving it therein.

Concrete often exhibits efflorescence. In the present invention, an efflorescence inhibitor may be used together with dye or the like. Dissolving time of the concrete penetration layer may be varied by varying conditions for preparing it, so that time of development of the coloring agent may be adjusted depending on curing of concrete.

The foregoing embodiment has been described with reference to deposition of the concrete penetration layer on the pattern formwork for concrete. Alternatively, the concrete penetration layer may be deposited on a substrate other than the pattern formwork which may be made of a material such as, for example, paper, fabric, synthetic resin, plywood or metal. For example, deposition of the concrete penetration layer on fabric permits desired coloring of concrete to be carried out by applying the fabric to a surface of concrete prior to drying of concrete. Further, tire concrete penetration layer may be deposited directly on a panel for concrete which is made of plywood or steel. Moreover, the fabric, paper, synthetic resin, plywood, metal or the like described above may be applied to the panel for concrete.

In the above-described embodiment, the salt of spiculisporic acid is used as dispersant. However, any surface-active agent prepared by fermentation may be conveniently used as dispersant for the present invention. Thus, a salt of malic acid and the like likewise exhibit substantially the same advantage.

As can be seen form the foregoing, in the present invention, only contact of the substrate with concrete containing water permits the dye or the like to penetrate into the concrete, resulting in attaining desired coloring of concrete while preventing skin characteristics of concrete from being deteriorated, unlike the prior art wherein painting is carried out on a surface of concrete.

Also, in the present invention, polyethylene oxide is used as the water-soluble adhesive. This effectively prevents occurrence of calcium salts and fungi in concrete, gelation of concrete, and adverse affection to concrete. Also, this permits the dye or the like to deeply penetrate into concrete without using any synthetic surface-active agent which adversely affects surface strength of concrete. Concrete thus colored is substantially prevented from being decolored due to exposure to rain or the like.

Further, the present invention may use a surface-active agent prepared by fermentation in place of a synthetic surface-active agent. The surface-active agent by fermentation exhibits highly reduced expansion properties, increased cushioning properties, and a stable surface-active function over a wide pH range, to thereby permit the dye or the like to more deeply penetrate into concrete.

Furthermore, in the present invention, the pattern formwork for concrete may be used as the substrate, so that only concrete forming permits coloring of concrete to be accomplished concurrent with formation of concrete.

Moreover, the pattern formwork for concrete may be formed thereon with projections which serve to develop joints on concrete to define unit configurations such as rocks on concrete. Thus, the present invention provides concrete with natural aesthetic properties.

The present invention will be understood more readily with reference to the following examples; however, these examples are intended to illustrate the invention and are not to be construed to limit the scope of the invention.

EXAMPLE 1

In this example, as shown in FIG. 1, a layer 10 of expanded styrol which was formed on a surface thereof with an uneven pattern in contrast with all uneven pattern to be developed on a surface of concrete was applied to a single panel 12 for concrete, resulting in a pattern formwork 14 for concrete being formed. Also, the formwork 14 was formed thereon with projections 16 for developing joints on concrete which serve to define unit configurations such as rock configurations on a surface of concrete formed.

Then, the expanded styrol layer 10 was coated thereon with a concrete penetration layer 18 containing brown pigment by means of a spray gun. The layer 18 was formed into a thickness of 60 µm.

The pattern formwork 14 thus formed was located opposite to a panel 20 for concrete and then fixedly connected thereto by means of fasteners 22 so as to be spaced from each other, resulting in a space being defined therebetween.

Figure 2:
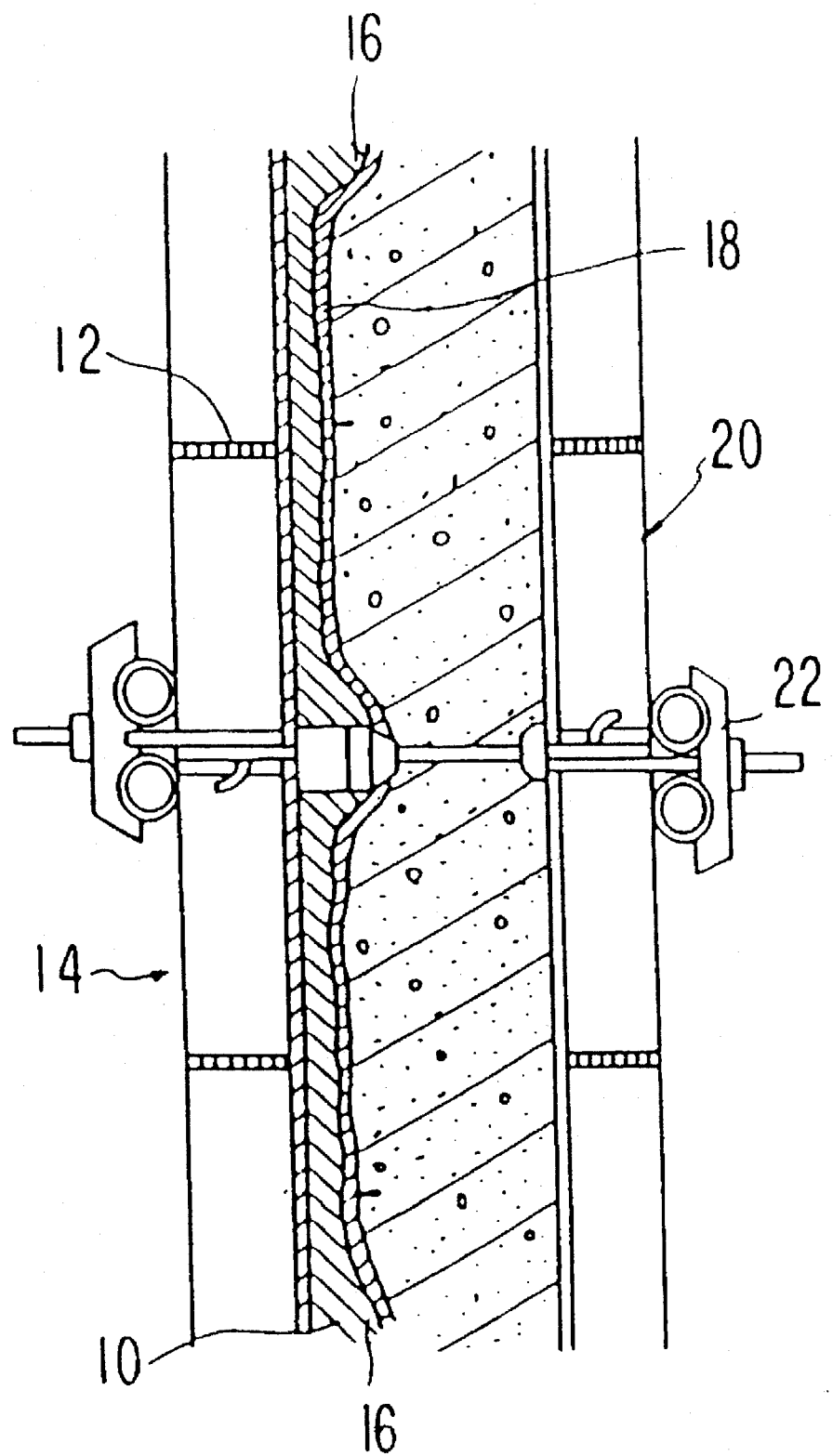
FIG. 2 is a sectional view showing concrete formed between a pattern formwork for concrete and a panel for concrete.

Subsequently, concrete consisting of 14% of cement, 80% of aggregate and 7% of water was placed in the space between the formwork 14 and the panel 20 as shown in FIG. 2. When the formwork was released after four days, it was found that a surface of the concrete was brown-colored. The colored portion of the concrete was not discolored although it was thoroughly washed with water. It was found that the pigment penetrated into time concrete by a depth of about 8 mm.

EXAMPLE 2

Example 1 was substantially repeated except that a composition containing black dye and a composition containing white pigment were separately sprayed oil concrete so as to form a spotted pattern thereon, resulting in a concrete penetration layer of 80 µm in thickness being formed. Then, concrete forming was carried out and then a formwork was released from the concrete after curing of the concrete. All appearance of a concrete wall obtained was patterned with white and black spots and exhibited distinct boundaries between white and black.

While the invention has been described with a certain degree of particularity with reference to its preferred embodiment and examples, obvious modifications and variations are possible in light of the above teachings. It is therefore to be understood that within the scope of time appended claims, the invention may be practiced otherwise than as specifically described.

What is claimed is:

1. A process for coloring concrete comprising the steps of:

providing a pattern formwork for concrete having a textured concrete contact surface;

applying a concrete penetration layer of about 30 to about 200 µm in thickness to the concrete contact surface of the pattern formwork;

placing the pattern formwork in spaced relation to a panel;

placing concrete in the space between the pattern formwork and the panel;

curing the concrete; and releasing the pattern formwork from the concrete, wherein said concrete penetration layer comprises:

a) polyethylene oxide having a molecular weight of about 100,000 to about 5,000,000, said polyethylene oxide prepared by ring opening polymerization of ethylene oxide, and b) a composition containing an additive selected from the group consisting of dyes, pigments and mixtures thereof.

2. A process as defined in claim 1, wherein the concrete penetration layer is coated on the concrete contact surface of the pattern formwork by means of a spray gun or a brush.

3. A process for coloring concrete comprising the steps of:

providing a pattern formwork for concrete having a textured concrete contact surface;

applying a concrete penetration layer of about 30 to about 200 µm in thickness to the concrete contact surface of the pattern formwork;

placing the pattern formwork in spaced relation to a panel;

placing concrete in the space between the pattern formwork and the panel;

curing the concrete; and releasing the pattern formwork from the concrete, wherein said concrete penetration layer comprises:
- a) polyethylene oxide having a molecular weight of about 100,000 to about 5,000,000, said polyethylene oxide prepared by ring opening polymerization of ethylene oxide,
- b) a composition containing an additive selected from the group consisting of dyes, pigments and mixtures thereof, and
- c) a surface-active agent prepared by fermentation and serving as a dispersant for the composition.

4. A process as defined in claim 1, wherein the concrete penetration layer is coated on the concrete contact surface of the pattern formwork by means of a spray gun or a brush.

* * * * *